United States Patent
Onodera

(10) Patent No.: US 11,508,520 B2
(45) Date of Patent: Nov. 22, 2022

(54) ELECTRONIC COMPONENT WITH EXTERNAL ELECTRODE INCLUDING CONDUCTIVE RESIN LAYER AND METHOD FOR PRODUCING ELECTRONIC COMPONENT

(71) Applicant: TDK CORPORATION, Tokyo (JP)

(72) Inventor: Shinya Onodera, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/331,309

(22) Filed: May 26, 2021

(65) Prior Publication Data

US 2021/0398747 A1 Dec. 23, 2021

(30) Foreign Application Priority Data

Jun. 22, 2020 (JP) .............................. JP2020-106938

(51) Int. Cl.
*H01G 4/012* (2006.01)
*H01G 4/12* (2006.01)
*H01G 4/30* (2006.01)
*H01G 2/06* (2006.01)
*H01G 4/008* (2006.01)

(52) U.S. Cl.
CPC .............. *H01G 4/12* (2013.01); *H01G 2/065* (2013.01); *H01G 4/008* (2013.01); *H01G 4/012* (2013.01); *H01G 4/30* (2013.01)

(58) Field of Classification Search
CPC .......... H01G 4/12; H01G 2/065; H01G 4/008; H01G 4/012; H01G 4/30; H01G 4/1209
See application file for complete search history.

(56) References Cited

U.S. PATENT DOCUMENTS

| | | | |
|---|---|---|---|
| 9,974,183 B2* | 5/2018 | Chae | H05K 1/111 |
| 2009/0040688 A1* | 2/2009 | Kayatani | H01G 13/006 |
| | | | 361/321.1 |
| 2009/0052114 A1* | 2/2009 | Motoki | H01G 4/2325 |
| | | | 361/306.3 |
| 2014/0116766 A1* | 5/2014 | Jeon | H05K 3/3442 |
| | | | 361/321.2 |
| 2015/0022945 A1* | 1/2015 | Park | H01G 4/2325 |
| | | | 156/89.18 |
| 2015/0043125 A1* | 2/2015 | Park | H01G 4/30 |
| | | | 156/89.12 |
| 2017/0062133 A1* | 3/2017 | Lee | H01G 4/232 |
| 2019/0131076 A1* | 5/2019 | Fukumura | H01G 4/232 |
| 2021/0272756 A1* | 9/2021 | Chikuma | H01G 4/1209 |
| 2022/0037087 A1* | 2/2022 | Yi | H01G 4/248 |

FOREIGN PATENT DOCUMENTS

JP H5-144665 A 6/1993
JP 2009088319 A * 4/2009

* cited by examiner

*Primary Examiner* — David M Sinclair
*Assistant Examiner* — Daniel M Dubuisson
(74) *Attorney, Agent, or Firm* — Oliff PLC

(57) ABSTRACT

An electronic component includes an element body and an external electrode disposed on the element body. The external electrode includes a conductive resin layer and a plating layer disposed on the conductive resin layer. The conductive resin layer includes a surface partially provided with a resin lump including an electrically insulating resin. The resin lump includes a surface exposed from the plating layer.

9 Claims, 12 Drawing Sheets

ELECTRONIC COMPONENT WITH EXTERNAL ELECTRODE INCLUDING CONDUCTIVE RESIN LAYER AND METHOD FOR PRODUCING ELECTRONIC COMPONENT

BACKGROUND OF THE INVENTION

1. Field of the Invention

A first aspect of the present invention relates to an electronic component. A second aspect of the present invention relates to a method for producing an electronic component.

2. Description of Related Art

Known electronic components include an element body and an external electrode disposed on the element body (for example, refer to Japanese Unexamined Patent Publication No. H5-144665). The external electrode includes a conductive resin layer and a plating layer disposed on the conductive resin layer.

SUMMARY OF THE INVENTION

The conductive resin layer generally includes a resin and conductive particles. The resin tends to absorb moisture. In a case where the electronic component is solder-mounted on an electronic device, the moisture absorbed by the resin may be gasified so that volume expansion may occur. In which case, stress may act on the conductive resin layer, and the conductive resin layer may peel off. The conductive particles include, for example, metal. The electronic device includes, for example, a circuit board or an electronic component.

An object of a first aspect of the present invention is to provide an electronic component that controls peel-off of a conductive resin layer. An object of a second aspect of the present invention is to provide a method for producing an electronic component that controls peel-off of a conductive resin layer.

An electronic component according to the first aspect includes an element body and an external electrode disposed on the element body. The external electrode includes a conductive resin layer and a plating layer disposed on the conductive resin layer. The conductive resin layer includes a surface partially provided with a resin lump including an electrically insulating resin. The resin lump includes a surface exposed from the plating layer.

In the first aspect, the resin lump is exposed from the plating layer. During solder-mounting the electronic component on an electronic device, even in a case where moisture absorbed by the resin is gasified, the gas generated from the moisture moves out of the external electrode through the resin lump from the conductive resin layer. The gas generated from the moisture is discharged from the resin lump (the surface of the resin lump). Therefore, stress tends not to apply to the conductive resin layer. Consequently, the first aspect controls the peel-off of the conductive resin layer.

In the first aspect, the element body may include a principal surface arranged to constitute a mounting surface and an end surface adjacent to the principal surface. The resin lump may be positioned on the end surface.

When the electronic component is solder-mounted on an electronic device, the principal surface opposes the electronic device, but the end surface does not oppose the electronic device. Therefore, the configuration in which the resin lump is positioned on the end surface tends not to prevent the gas generated from moisture from being discharged from the resin lump (the surface of the resin lump). Consequently, this configuration reliably discharges the gas generated from the moisture from the conductive resin layer.

In the first aspect, the surface of the resin lump may have an exposed area ratio of 0.000001 to 0.1 to an area of the end surface.

The configuration in which the ratio is 0.000001 or more reliably discharges the gas generated from the moisture from the conductive resin layer. The configuration in which the ratio is 0.1 or less reduces an increase in amount of the moisture that penetrates into the conductive resin layer from the surface of the resin lump.

In the first aspect, the resin lump may have a thickness of 1 µm or more and 100 µm or less.

The configuration in which the thickness of the resin lump is 1 µm or more reliably discharges the gas generated from the moisture from the conductive resin layer. In the configuration in which the thickness of the resin lump is 100 µm or less, the resin lump tends not to interfere with the solder-mounting, and the conductive resin layer reliably exerts stress relaxation effects.

In the first aspect, the resin lump may contain a resin being the same as a resin contained in the conductive resin layer.

In the configuration in which the resin lump contains a resin being the same as a resin contained in the conductive resin layer, the electronic component that controls the peel-off of the conductive resin layer is obtained easily and at low cost.

A method for producing an electronic component according to the second aspect is a method for producing the electronic component according to the first aspect. The second aspect includes: forming a paste film including an electrically conductive resin paste on the element body and curing the electrically conductive resin paste of the paste film to form the conductive resin layer; and forming the plating layer on the conductive resin layer. In the second aspect, a resin pool which is to be the resin lump on a surface of the paste film is formed with a resin contained in the electrically conductive resin paste, before curing the electrically conductive resin paste.

In the second aspect, the resin lump is obtained from the resin pool formed on the surface of the paste film including the electrically conductive resin paste. When forming the plating layer on the conductive resin layer, the plating layer tends not to be formed on the surface of the resin lump. Therefore, the surface of the resin lump is exposed from the plating layer. Consequently, the electronic component obtained through the second aspect controls the peel-off of the conductive resin layer as described above.

In the second aspect, the resin pool is formed with the resin contained in the electrically conductive resin paste. Therefore, it is not required to newly prepare a resin for forming the resin pool.

Consequently, the electronic component that controls the peel-off of the conductive resin layer is obtained easily and at low cost.

In the second aspect, the resin pool may be formed through applying an organic solvent to the surface of the paste film before curing the electrically conductive resin paste.

In this case, the resin pool is formed reliably and easily.

In the second aspect, the resin contained in the electrically conductive resin paste may be a thermosetting resin. When the electrically conductive resin paste is thermally cured, the resin contained in the electrically conductive resin paste may be exuded to the surface of the paste film to form the resin pool.

In this case, the resin pool is formed reliably and easily.

The second aspect may include preparing a base on which the element body formed with the paste film is placed. The element body formed with the paste film may be placed on the base in such a manner that a gap is formed between a part of the paste film and the base. The resin may be softened and spread on the gap due to capillarity to form the resin pool.

In this case, the resin pool is formed more reliably and easily.

In the second aspect, the gap may have a size of 100 μm or less.

In this case, the softened resin reliably spreads on the gap due to capillarity.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

DETAILED DESCRIPTION OF EMBODIMENTS

Figure 1:
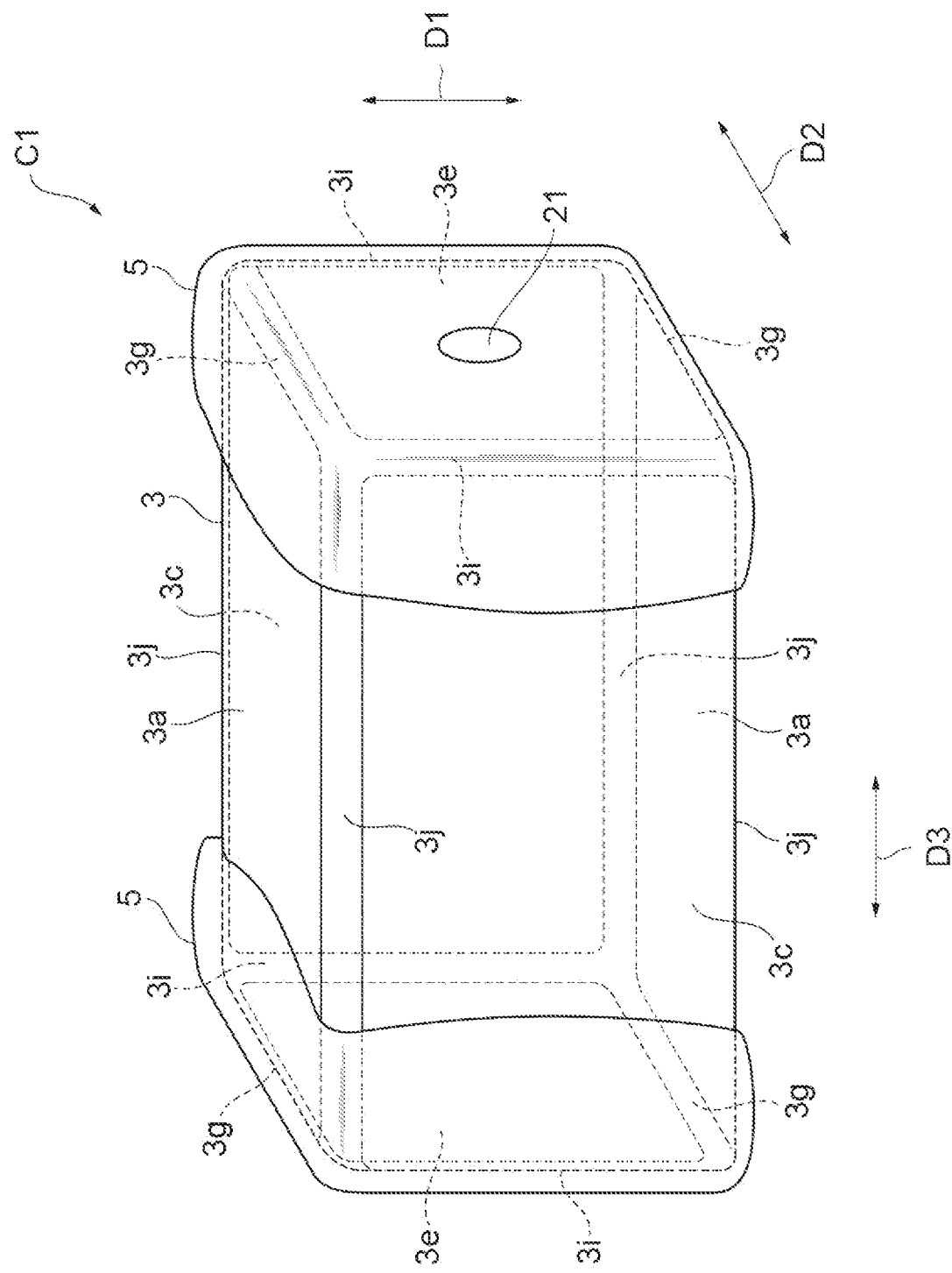
FIG. 1 is a perspective view of a multilayer capacitor according to an embodiment.

Hereinafter, embodiments of the present invention will be described in detail with reference to the accompanying drawings. In the following description, the same elements or elements having the same functions are denoted with the same reference numerals and overlapped explanation is omitted.

Figure 2:
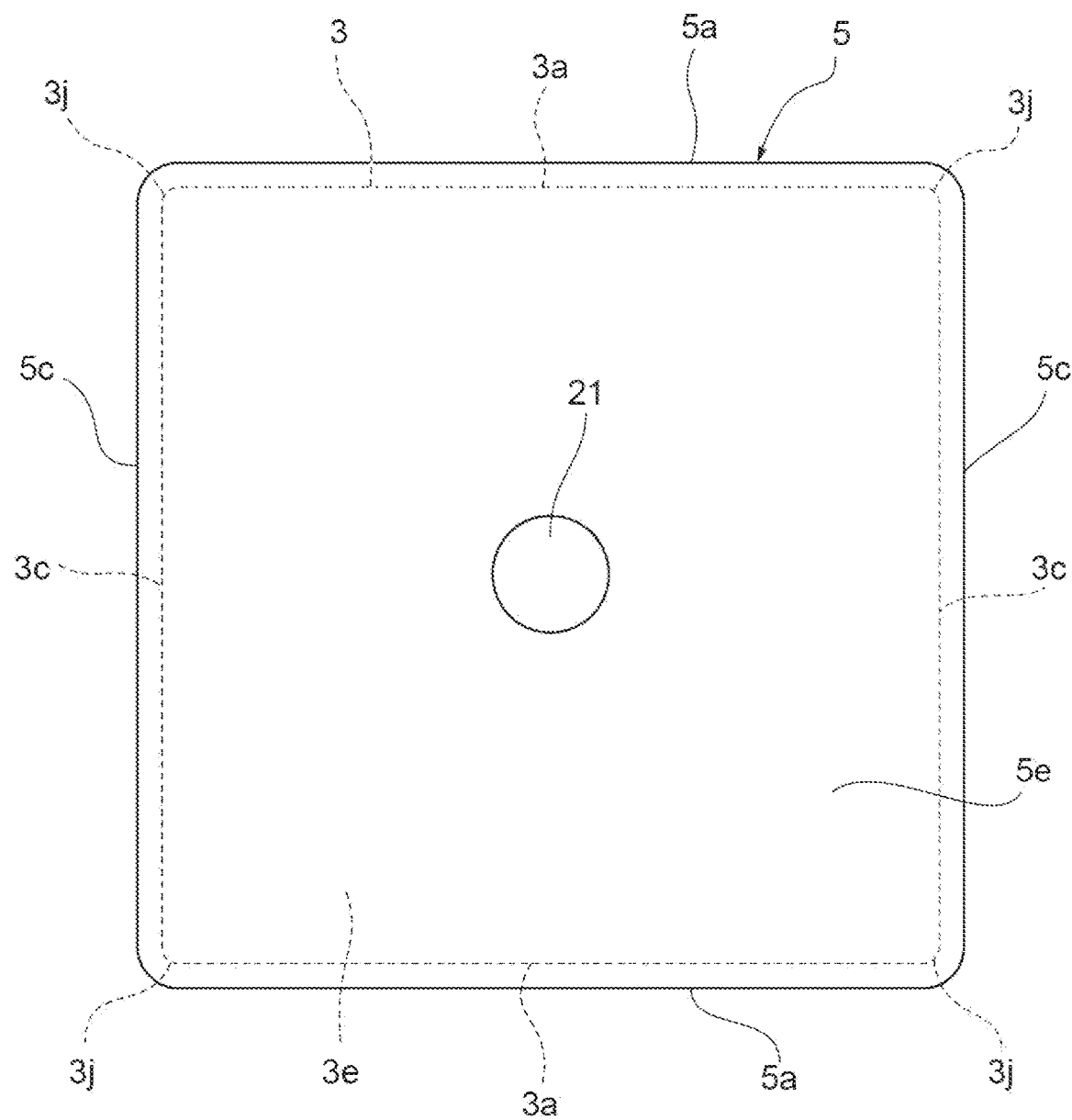
FIG. 2 is an end view illustrating the multilayer capacitor according to the embodiment.
Figure 3:
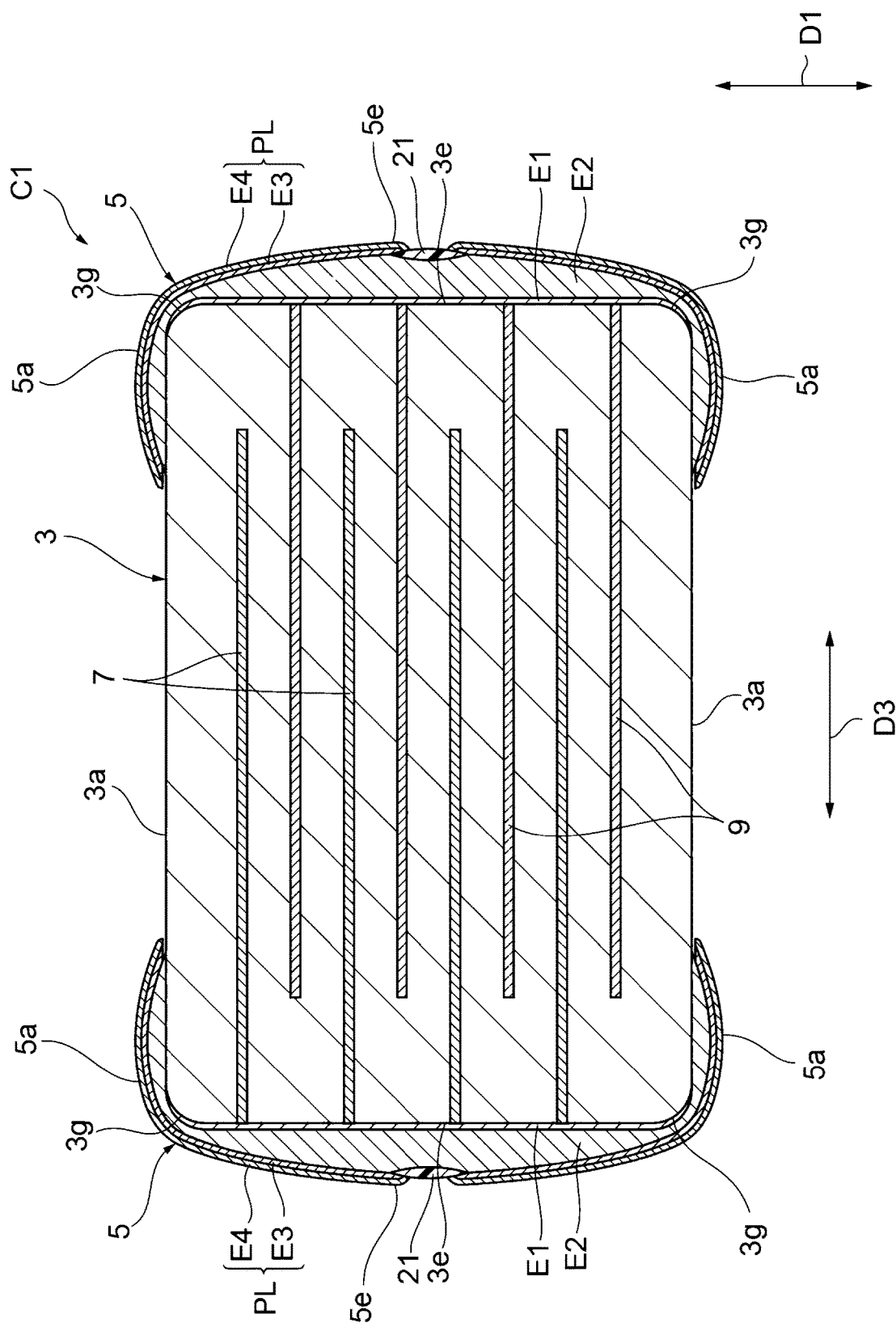
FIG. 3 is a view illustrating a cross-sectional configuration of the multilayer capacitor according to the embodiment.
Figure 4:
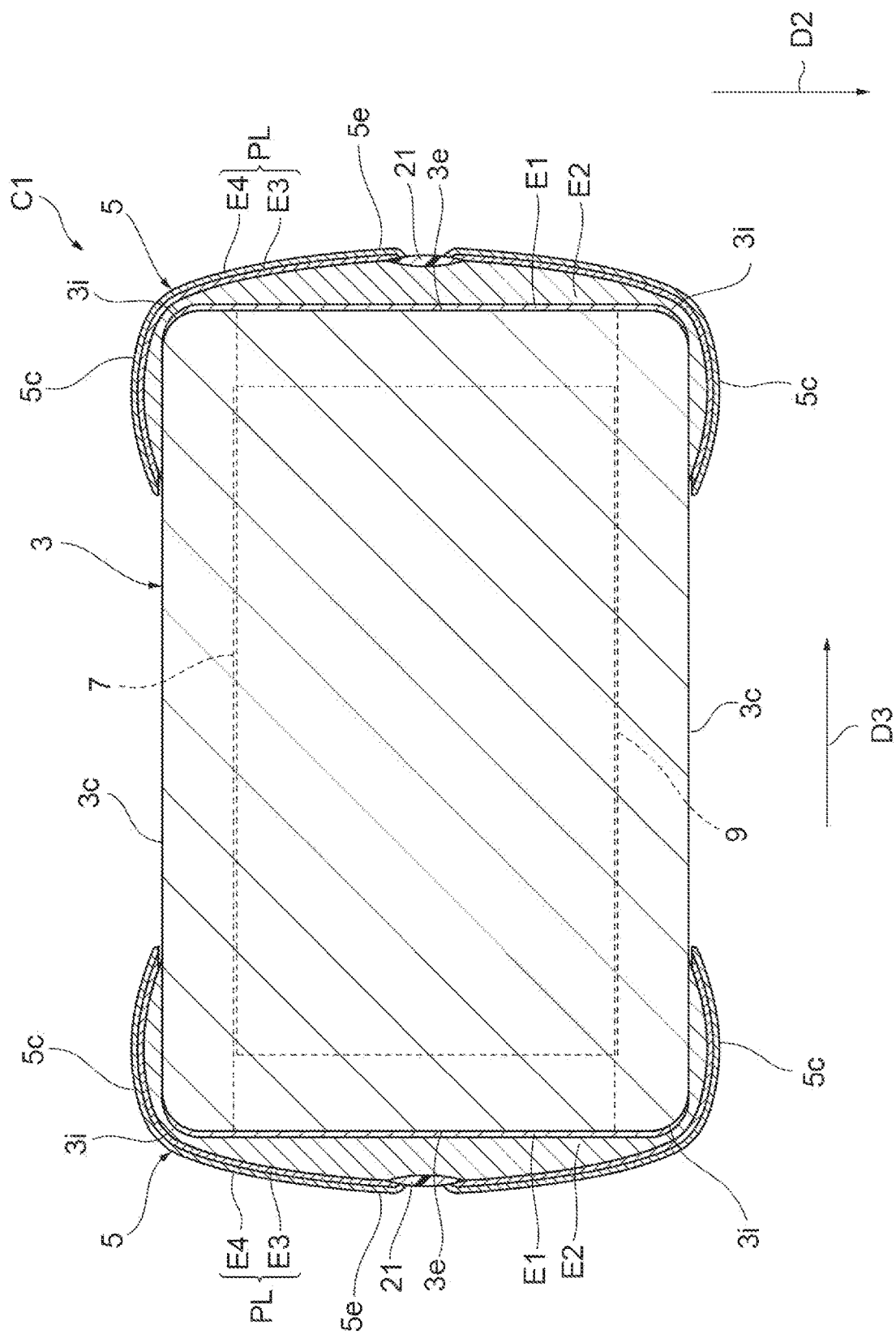
FIG. 4 is a view illustrating a cross-sectional configuration of the multilayer capacitor according to the embodiment.
Figure 5:
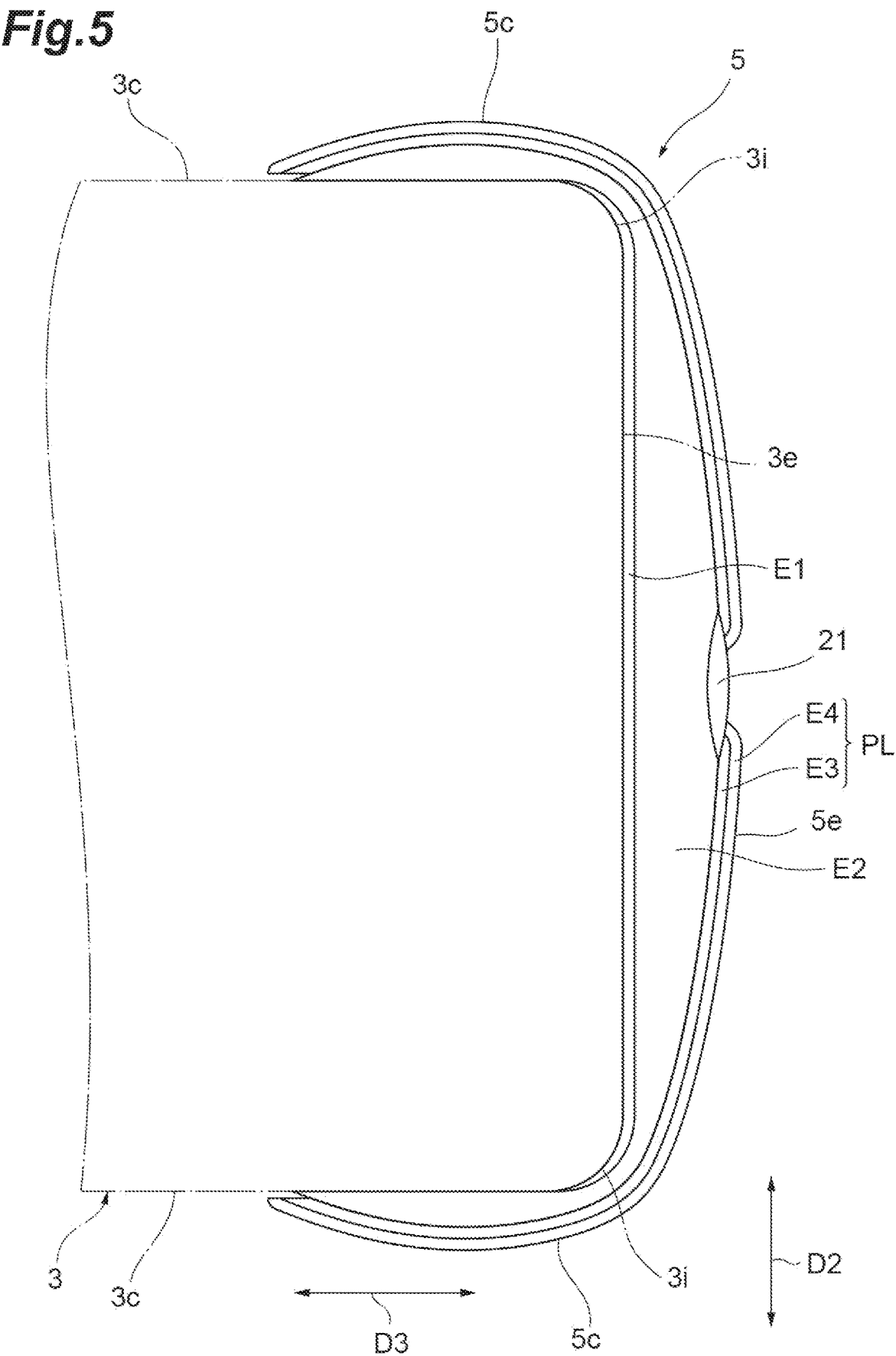
FIG. 5 is a view illustrating a cross-sectional configuration of an external electrode.
Figure 6:
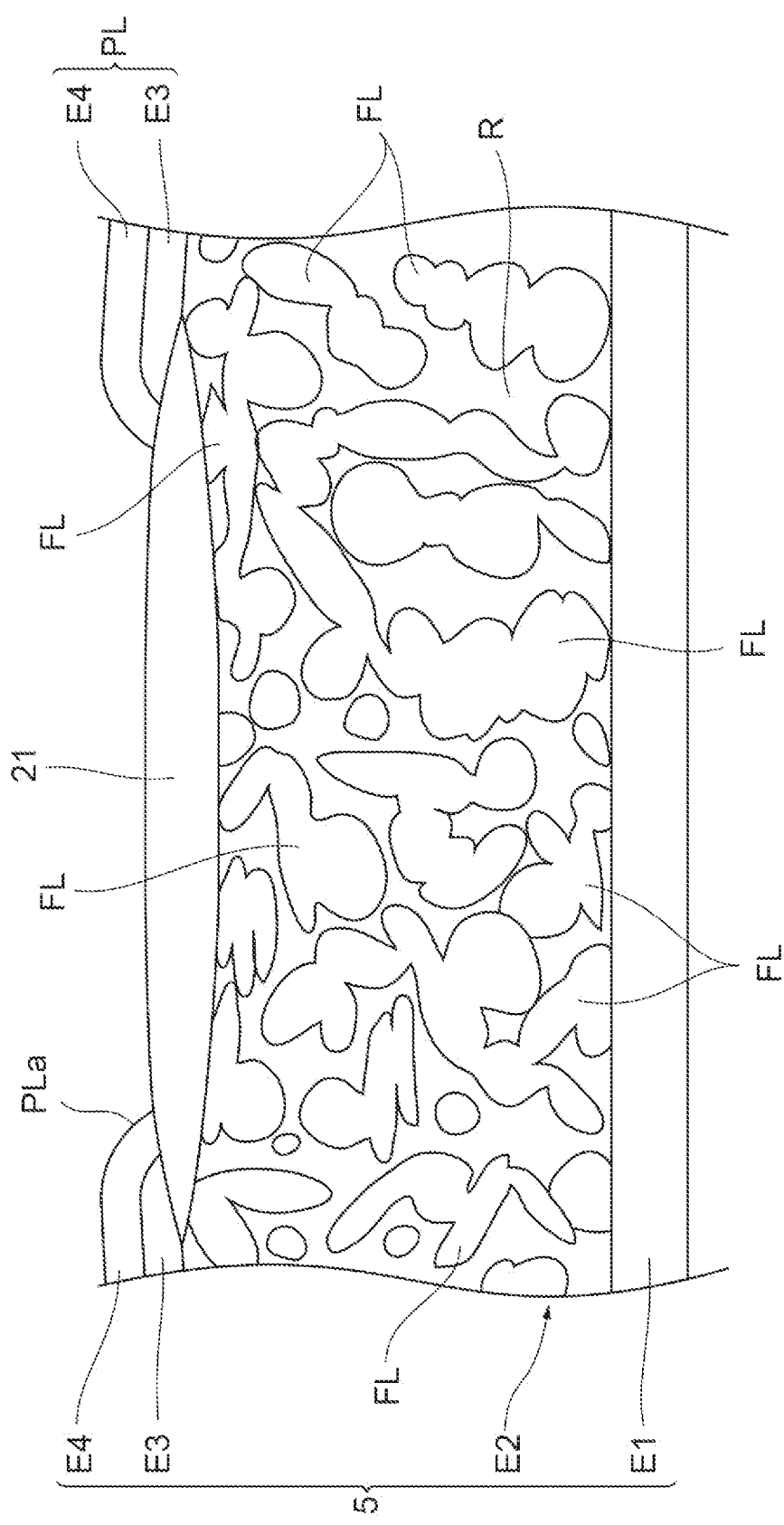
FIG. 6 is a schematic view illustrating a cross-sectional configuration of the external electrode.

A configuration of a multilayer capacitor C1 according to an embodiment will be described with reference to FIGS. 1 to 6. FIG. 1 is a perspective view of a multilayer capacitor according to the embodiment. FIG. 2 is an end view illustrating the multilayer capacitor according to the embodiment. FIGS. 3 and 4 are views illustrating a cross-sectional configuration of the multilayer capacitor according to the embodiment. FIG. 5 is a view illustrating a cross-sectional configuration of an external electrode. FIG. 6 is a schematic view illustrating a cross-sectional configuration of the external electrode. In the present embodiment, an electronic component includes, for example, the multilayer capacitor C1. In FIGS. 5 and 6, hatching representing a cross section is omitted.

As illustrated in FIG. 1, the multilayer capacitor C1 includes an element body 3 of a rectangular parallelepiped shape and a plurality of external electrodes 5. In the present embodiment, the multilayer capacitor C1 includes a pair of external electrodes 5. The pair of external electrodes 5 is disposed on an outer surface of the element body 3. The pair of external electrodes 5 is separated from each other. The rectangular parallelepiped shape includes a rectangular parallelepiped shape in which corners and ridges are chamfered, and a rectangular parallelepiped shape in which the corners and ridges are rounded.

The element body 3 includes a pair of principal surfaces 3a opposing each other, a pair of side surfaces 3c opposing each other, and a pair of end surfaces 3e opposing each other. The pair of principal surfaces 3a, the pair of side surfaces 3c, and the pair of end surfaces 3e have a rectangular shape. A direction in which the pair of principal surfaces 3a opposes each other is a first direction D1. A direction in which the pair of side surfaces 3c opposes each other is a second direction D2. A direction in which the pair of end surfaces 3e opposes each other is a third direction D3. The multilayer capacitor C1 is solder-mounted on an electronic device. The electronic device includes, for example, a circuit board or an electronic component. One principal surface 3a of the multilayer capacitor C1 opposes the electronic device. The one principal surface 3a is arranged to constitute a mounting surface. The one principal surface 3a is the mounting surface.

The first direction D1 is a direction orthogonal to the respective principal surfaces 3a and is orthogonal to the second direction D2. The third direction D3 is a direction parallel to the respective principal surfaces 3a and the respective side surfaces 3c, and is orthogonal to the first direction D1 and the second direction D2. The second direction D2 is a direction orthogonal to the respective side surfaces 3c. The third direction D3 is a direction orthogonal to the respective end surfaces 3e. In the present embodiment, a length of the element body 3 in the third direction D3 is larger than a length of the element body 3 in the first direction D1, and larger than a length of the element body 3 in the second direction D2. The third direction D3 is a longitudinal direction of the element body 3. The length of the element body 3 in the first direction D1 and the length of the element body 3 in the second direction D2 may be equivalent to each other. The length of the element body 3 in the first direction D1 and the length of the element body 3 in the second direction D2 may be different from each other.

The length of the element body 3 in the first direction D1 is a height of the element body 3. The length of the element body 3 in the second direction D2 is a width of the element body 3. The length of the element body 3 in the third direction D3 is a length of the element body 3. In the present embodiment, the element body 3 has a height of 0.5 to 2.5 mm, a width of 0.5 to 5.0 mm, and a length of 1.0 to 5.7 mm. The element body 3 has, for example, a height of 2.5 mm, a width of 2.5 mm, and a length of 3.2 mm.

The pair of side surfaces 3c extends in the first direction D1 to couple the pair of principal surfaces 3a. The pair of side surfaces 3c also extends in the third direction D3. The pair of end surfaces 3e extends in the first direction D1 to couple the pair of principal surfaces 3a. The pair of end surfaces 3e extends in the second direction D2.

The element body 3 includes four ridge portions 3g, four ridge portions 3i, and four ridge portions 3j. The ridge portion 3g is positioned between the end surface 3e and the principal surface 3a. The ridge portion 3i is positioned between the end surface 3e and the side surface 3c. The ridge portion 3j is positioned between the principal surface 3a and the side surface 3c. In the present embodiment, each of the ridge portions 3g, 3i, and 3j is rounded to curve. The element body 3 is subject to what is called a round chamfering process. The end surface 3e and the principal surface 3a are indirectly adjacent to each other with the ridge portion 3g between the end surface 3e and the principal surface 3a. The end surface 3e and the side surface 3c are indirectly adjacent to each other with the ridge portion 3i between the end surface 3e and the side surface 3c. The principal surface 3a and the side surface 3c are indirectly adjacent to each other with the ridge portion 3j between the principal surface 3a and the side surface 3c.

The element body 3 is configured through laminating a plurality of dielectric layers in the first direction D1. The element body 3 includes the plurality of laminated dielectric layers. In the element body 3, a lamination direction of the plurality of dielectric layers coincides with the first direction D1. Each dielectric layer includes, for example, a sintered body of a ceramic green sheet containing a dielectric material. The dielectric material includes, for example, a dielectric ceramic. The dielectric ceramic includes, for example, a dielectric ceramic of $BaTiO_3$ base, $Ba(Ti,Zr)O_3$ base, or $(Ba,Ca)TiO_3$ base. In an actual element body 3, each of the dielectric layers is integrated to such an extent that a boundary between the dielectric layers cannot be visually recognized. In the element body 3, the lamination direction of the plurality of dielectric layers may coincide with the second direction D2.

As illustrated in FIGS. 3 and 4, the multilayer capacitor C1 includes a plurality of internal electrodes 7 and a plurality of internal electrodes 9. Each of the internal electrodes 7 and 9 is an internal conductor disposed in the element body 3. Each of the internal electrodes 7 and 9 is made of an electrically conductive material that is commonly used as an internal conductor of a multilayer electronic component. The electrically conductive material includes, for example, a base metal. The electrically conductive material includes, for example, Ni or Cu. Each of the internal electrodes 7 and 9 is configured as a sintered body of electrically conductive paste containing the electrically conductive material described above. In the present embodiment, the internal electrodes 7 and 9 are made of Ni.

The internal electrodes 7 and the internal electrodes 9 are disposed in different positions (layers) in the first direction D1. The internal electrodes 7 and the internal electrodes 9 are alternately disposed in the element body 3 to oppose each other in the first direction D1 with an interval therebetween. Polarities of the internal electrodes 7 and the internal electrodes 9 are different from each other. In a case where the lamination direction of the plurality of dielectric layers is the second direction D2, the internal electrodes 7 and the internal electrodes 9 are disposed in different positions (layers) in the second direction D2. One end of each of the internal electrodes 7 and 9 is exposed to a corresponding end surface 3e of the pair of end surfaces 3e. Each of the internal electrodes 7 and 9 includes the one end exposed to the corresponding end surface 3e.

The plurality of internal electrodes 7 and the plurality of internal electrodes 9 are alternately disposed in the first direction D1. The internal electrodes 7 and 9 are positioned in a plane approximately parallel to the principal surfaces 3a. The internal electrodes 7 and the internal electrodes 9 oppose each other in the first direction D1. The direction (first direction D1) in which the internal electrodes 7 and the internal electrodes 9 oppose each other is orthogonal to the directions (second direction D2 and third direction D3) parallel to the principal surfaces 3a. In a case where the lamination direction of the plurality of dielectric layers is the second direction D2, the plurality of internal electrodes 7 and the plurality of internal electrodes 9 are alternately disposed in the second direction D2. In which case, the internal electrodes 7 and 9 are positioned in a plane approximately orthogonal to the principal surfaces 3a. The internal electrodes 7 and the internal electrodes 9 oppose each other in the second direction D2.

As illustrated in FIG. 1, the external electrodes 5 are disposed at both end portions of the element body 3 in the third direction D3. Each of the external electrodes 5 is disposed on the corresponding end surface 3e side of the element body 3. The external electrode 5 is disposed on at least the end surface 3e and the principal surface 3a that is also the side surface. In the present embodiment, each of the external electrodes 5 is disposed on the pair of principal surfaces 3a, the pair of side surfaces 3c, and the end surface 3e. As illustrated in FIGS. 2 to 4, the external electrode 5 includes a plurality of electrode portions 5a, 5c, and 5e. Each of the electrode portions 5a is disposed on the principal surface 3a and the ridge portion 3g. Each of the electrode portions 5c is disposed on the side surface 3c and the ridge portion 3i. The electrode portion 5e is disposed on the corresponding end surface 3e. The external electrode 5 also includes electrode portions disposed on the ridge portions 3j.

The external electrode 5 is formed on the five surfaces, that is, the pair of principal surfaces 3a, the end surface 3e, and the pair of side surfaces 3c, as well as on the ridge portions 3g, 3i, and 3j. The electrode portions 5a, 5c, and 5e adjacent each other are coupled and are electrically connected to each other. Each electrode portion 5e covers all the one ends of the corresponding internal electrodes 7 or 9. The electrode portion 5e is directly connected to the corresponding internal electrodes 7 or 9. The external electrode 5 is electrically connected to the corresponding internal electrodes 7 or 9. As illustrated in FIGS. 3 and 4, the external electrode 5 includes a first electrode layer E1, a second electrode layer E2, a third electrode layer E3, and a fourth electrode layer E4. The fourth electrode layer E4 is arranged to constitute the outermost layer of the external electrode 5. Each of the electrode portions 5a, 5c, and 5e includes the first electrode layer E1, the second electrode layer E2, the third electrode layer E3, and the fourth electrode layer E4.

The first electrode layer E1 included in the electrode portion 5a is disposed on the ridge portion 3g, and is not disposed on the principal surface 3a. The first electrode layer E1 included in the electrode portion 5a is formed to cover the entire ridge portion 3g. The first electrode layer E1 is not formed on the principal surface 3a. The first electrode layer E1 included in the electrode portion 5a is in contact with the entire ridge portion 3g. The principal surface 3a is not covered with the first electrode layer E1, and is exposed from the first electrode layer E1. The first electrode layer E1 included in the electrode portion 5a may be disposed on the principal surface 3a. In this case, the first electrode layer E1 included in the electrode portion 5a is formed to cover one part of the principal surface 3a and the entire ridge portion 3g. That is, the first electrode layer E1 included in the electrode portion 5a is also in contact with the one part of the principal surface 3a. The one part of the principal surface 3a is, for example, a partial region near the end surface 3e, in the principal surface 3a.

The second electrode layer E2 included in the electrode portion 5a is disposed on the first electrode layer E1 and on the principal surface 3a. In the electrode portion 5a, the second electrode layer E2 covers the entire first electrode layer E1. In the electrode portion 5a, the second electrode layer E2 is in contact with the entire first electrode layer E1. The second electrode layer E2 included in the electrode portion 5a is in contact with one part of the principal surface 3a. The one part of the principal surface 3a is, for example, a partial region near the end surface 3e, in the principal surface 3a. That is, the one part of the principal surface 3a is close to the end surface 3e. The electrode portion 5a is four-layered on the ridge portion 3g, and is three-layered on the principal surface 3a. The second electrode layer E2 included in the electrode portion 5a is formed to cover the one part of the principal surface 3a and the entire ridge portion 3g. As described above, the one part of the principal surface 3a is, for example, the partial region near the end surface 3e, in the principal surface 3a. The second electrode layer E2 included in the electrode portion 5a indirectly covers the entire ridge portion 3g and the one part of the principal surface 3a in such a manner that the first electrode layer E1 is positioned between the second electrode layer E2 and the element body 3. The second electrode layer E2 included in the electrode portion 5a directly covers the one part of the principal surface 3a. The second electrode layer E2 included in the electrode portion 5a directly covers an entire portion of the first electrode layer E1 formed on the ridge portion 3g. In a case where the first electrode layer E1 included in the electrode portion 5a is disposed on the principal surface 3a, the electrode portion 5a is four-layered on the principal surface 3a and the ridge portion 3g.

The first electrode layer E1 included in the electrode portion 5c is disposed on the ridge portion 3i, and is not disposed on the side surface 3c. The first electrode layer E1 included in the electrode portion 5c is formed to cover the entire ridge portion 3i. The first electrode layer E1 is not formed on the side surface 3c. The first electrode layer E1 included in the electrode portion 5c is in contact with the entire ridge portion 3i. The side surface 3c is not covered with the first electrode layer E1, and is exposed from the first electrode layer E1. The first electrode layer E1 included in the electrode portion 5c may be disposed on the side surface 3c. In this case, the first electrode layer E1 included in the electrode portion 5c is formed to cover one part of the side surface 3c and the entire ridge portion 3i. That is, the first electrode layer E1 included in the electrode portion 5c is also in contact with the one part of the side surface 3c. The one part of the side surface 3c is, for example, a partial region near the end surface 3e, in the side surface 3c.

The second electrode layer E2 included in the electrode portion 5c is disposed on the first electrode layer E1 and on the side surface 3c. In the electrode portion 5c, the second electrode layer E2 covers the entire first electrode layer E1. In the electrode portion 5c, the second electrode layer E2 is in contact with the entire first electrode layer E1. The second electrode layer E2 is in contact with one part of the side surface 3c. The one part of the side surface 3c is, for example, a partial region near the end surface 3e, in the side surface 3c. That is, the one part of the side surface 3c is close to the end surface 3e. The electrode portion 5c is four-layered on the ridge portion 3i, and is three-layered on the side surface 3c. The second electrode layer E2 included in the electrode portion 5c is formed to cover the entire ridge portion 3i and the one part of the side surface 3c. As described above, the one part of the side surface 3c is, for example, the partial region near the end surface 3e, in the side surface 3c. The second electrode layer E2 included in the electrode portion 5c indirectly covers the entire ridge portion 3i and the one part of the side surface 3c in such a manner that the first electrode layer E1 is positioned between the second electrode layer E2 and the element body 3. The second electrode layer E2 included in the electrode portion 5c directly covers the one part of the side surface 3c. The second electrode layer E2 included in the electrode portion 5c directly covers the entire portion of the first electrode layer E1 formed on the ridge portion 3i. In a case where the first electrode layer E1 included in the electrode portion 5c is disposed on the side surface 3c, the electrode portion 5c is four-layered on the side surface 3c and the ridge portion 3i.

The second electrode layer E2 included in the electrode portion 5c may be formed to cover one part of the ridge portion 3i and one part of the side surface 3c. The one part of the ridge portion 3i is, for example, a partial region near the principal surface 3a, in the ridge portion 3i. The one part of the side surface 3c is, for example, a corner region near the principal surface 3a and the end surface 3e, in the side surface 3c. In this case, the second electrode layer E2 included in the electrode portion 5c indirectly covers the one part of the ridge portion 3i in such a manner that the first electrode layer E1 is positioned between the second electrode layer E2 and the ridge portion 3i. The second electrode layer E2 included in the electrode portion 5c directly covers the one part of the side surface 3c. The second electrode layer E2 included in the electrode portion 5c directly covers a part of the portion of the first electrode layer E1 formed on the ridge portion 3i. That is, the electrode portion 5c includes a region where the first electrode layer E1 is exposed from the second electrode layer E2 and a region where the first electrode layer E1 is covered with the second electrode layer E2. In a case where the second electrode layer E2 of the electrode portion 5c is formed to cover the one part of the ridge portion 3i and the one part of the side surface 3c, as described above, the internal electrodes 7 and the internal electrodes 9 may be disposed in different positions (layers) in the second direction D2.

The first electrode layer E1 included in the electrode portion 5e is disposed on the end surface 3e. The end surface 3e is entirely covered with the first electrode layer E1. The first electrode layer E1 included in the electrode portion 5e is in contact with the entire end surface 3e. The second electrode layer E2 included in the electrode portion 5e is disposed on the first electrode layer E1. In the electrode portion 5e, the second electrode layer E2 is in contact with the entire first electrode layer E1. The second electrode layer E2 included in the electrode portion 5e is formed to cover the entire end surface 3e. The second electrode layer E2 included in the electrode portion 5e indirectly covers the entire end surface 3e in such a manner that the first electrode layer E1 is positioned between the second electrode layer E2 and the end surface 3e. The second electrode layer E2 included in the electrode portion 5e directly covers the entire first electrode layer E1. In the electrode portion 5e, the first electrode layer E1 is formed on the end surface 3e to be coupled to the one ends of the corresponding internal electrodes 7 or 9.

The second electrode layer E2 included in the electrode portion 5e may be formed to cover one part of the end surface 3e. The one part of the end surface 3e is, for example, a partial region near the principal surface 3a, in the end surface 3e. In this case, the second electrode layer E2 included in the electrode portion 5e indirectly covers the one part of the end surface 3e in such a manner that the first electrode layer E1 is positioned between the second electrode layer E2 and the end surface 3e. The second electrode layer E2 included in the electrode portion 5e directly covers a part of the portion of the first electrode layer E1 formed on the end surface 3e. That is, the electrode portion 5e includes a region where the first electrode layer E1 is exposed from the second electrode layer E2 and a region where the first electrode layer E1 is covered with the second electrode layer E2. In a case where the second electrode layer E2 of the electrode portion 5c is formed to cover the one part of the side surface 3e, as described above, the internal electrodes 7 and the internal electrodes 9 may be disposed in different positions (layers) in the second direction D2.

The first electrode layer E1 is formed through sintering electrically conductive paste applied onto a surface of the element body 3. The first electrode layer E1 is formed to cover the end surface 3e and the ridge portions 3g, 3i, and 3j. The first electrode layer E1 is formed through sintering a metal component (metal powder) contained in the electrically conductive paste. The first electrode layer E1 includes a sintered metal layer. The first electrode layer E1 includes a sintered metal layer formed on the element body 3. In the present embodiment, the first electrode layer E1 is a sintered metal layer made of Cu. The first electrode layer E1 may be a sintered metal layer made of Ni. The first electrode layer E1 includes a base metal. The electrically conductive paste contains, for example, powder made of Cu or Ni, a glass component, an organic binder, and an organic solvent. The first electrode layer E1 included in the electrode portion 5a, the first electrode layer E1 included in the electrode portion 5c, and the first electrode layer E1 included in the electrode portion 5e are integrally formed.

The second electrode layer E2 is formed through curing electrically conductive resin paste applied onto the first electrode layer E1, the principal surface 3a, and the pair of side surfaces 3c. The second electrode layer E2 is formed on the first electrode layer E1 and on the element body 3. The second electrode layer E2 is continuously formed over the first electrode layer E1 and the element body 3. The first electrode layer E1 is an underlying metal layer for forming the second electrode layer E2. The second electrode layer E2 is a conductive resin layer covering the first electrode layer E1. The second electrode layer E2 includes a conductive resin layer. The electrically conductive resin paste contains, for example, a resin, an electrically conductive material, and an organic solvent. The resin is, for example, a thermosetting resin. The electrically conductive material includes, for example, metal powder. The metal powder includes, for example, Ag powder or Cu powder. The thermosetting resin includes, for example, a phenolic resin, an acrylic resin, a silicone resin, an epoxy resin, or a polyimide resin. The second electrode layer E2 is in contact with the partial region of the ridge portion 3j. The second electrode layer E2 included in the electrode portion 5a, the second electrode layer E2 included in the electrode portion 5c, and the second electrode layer E2 included in the electrode portion 5e are integrally formed.

As illustrated in FIG. 6, the second electrode layer E2 includes a plurality of electrically conductive fillers FL and a resin R. The electrically conductive filler FL includes, for example, the above-described metal powder. The plurality of electrically conductive fillers FL forms a plurality of electrically conductive paths in the second electrode layer E2. A part of the plurality of electrically conductive fillers FL is in contact with the first electrode layer E1. Another part of the plurality of electrically conductive fillers FL is exposed to a surface of the second electrode layer E2. The conductive fillers FL exposed to the surface of the second electrode layer E2 is in contact with the third electrode layer E3. The plurality of conductive fillers FL electrically connects the first electrode layer E1 and the third electrode layer E3.

The third electrode layer E3 is formed on the second electrode layer E2 through a plating method. In the present embodiment, the third electrode layer E3 is formed on the second electrode layer E2 from Ni plating. The third electrode layer E3 includes a Ni plating layer. The third electrode layer E3 may be an Sn plating layer, a Cu plating layer, or an Au plating layer. The third electrode layer E3 contains Ni, Sn, Cu, or Au. The Ni plating layer has better solder leach resistance than the metal contained in the second electrode layer E2. The third electrode layer E3 covers the second electrode layer E2.

The fourth electrode layer E4 is formed on the third electrode layer E3 through a plating method. The fourth electrode layer E4 includes a solder plating layer. In the present embodiment, the fourth electrode layer E4 is formed on the third electrode layer E3 from Sn plating. The fourth electrode layer E4 includes an Sn plating layer. The fourth electrode layer E4 may be an Sn—Ag alloy plating layer, an Sn—Bi alloy plating layer, or an Sn—Cu alloy plating layer. The fourth electrode layer E4 contains Sn, Sn—Ag alloy, Sn—Bi alloy, or Sn—Cu alloy.

The third electrode layer E3 and the fourth electrode layer E4 constitute a plating layer PL formed on the second electrode layer E2. In the present embodiment, the plating layer PL formed on the second electrode layer E2 is two-layered. The plating layer PL covers the second electrode layer E2. The third electrode layer E3 is an intermediate plating layer positioned between the fourth electrode layer E4 arranged to constitute the outermost layer and the second electrode layer E2. The third electrode layer E3 included in the electrode portion 5a, the third electrode layer E3 included in the electrode portion 5c, and the third electrode layer E3 included in the electrode portion 5e are integrally formed. The fourth electrode layer E4 included in the electrode portion 5a, the fourth electrode layer E4 included in the electrode portion 5c, and the fourth electrode layer E4 included in the electrode portion 5e are integrally formed.

The multilayer capacitor C1 includes a plurality of resin lumps 21 as illustrated in FIG. 1. In the present embodiment, the multilayer capacitor C1 includes two resin lumps 21. The resin lumps 21 are disposed on the external electrodes 5, respectively. In the present embodiment, as illustrated in FIG. 2, the resin lumps 21 are disposed on the electrode portions 5e, respectively. One resin lump 21 is disposed on each electrode portion 5e. The resin lumps 21 are positioned on the end surfaces 3e. In the present embodiment, each resin lump 21 is positioned on a central part of each end surface 3e.

As illustrated in FIG. 6, the resin lump 21 is positioned on a part of the surface of the second electrode layer E2. The resin lump 21 covers the part of the surface of the second electrode layer E2. The surface of the second electrode layer E2 includes a region in contact with the resin lump 21 and a region in contact with the plating layer PL (third electrode layer E3). A surface of the resin lump 21 is exposed from the plating layer PL. An opening PLa is formed in the plating layer PL at a position where the resin lump 21 is exposed. The electrically conductive filler FL in contact with the resin lump 21 is not in direct contact with the plating layer PL (third electrode layer E3).

The resin lump 21 is made of an electrically insulating resin. The resin contained in the resin lump 21 is, for example, a thermosetting resin. Examples of the thermosetting resin include a phenolic resin, an acrylic resin, a silicone resin, an epoxy resin, or a polyimide resin. In the present embodiment, the resin contained in the resin lump 21 is the same as the resin R contained in the second electrode layer E2. The resin contained in the resin lump 21 may be continuous with the resin R contained in the second electrode layer E2. That is, the resin contained in the resin lump 21 may be integrated with the resin R contained in the second electrode layer E2.

The surface of the resin lump 21 has an exposed area ratio Ra of 0.000001 to 0.1 to an area of the end surface 3e. That is, the ratio Ra is defined by "the exposed area of the surface of the resin lump 21 ($\mu m^2$)/the area of the end surface 3e ($\mu^2$)."

The area of the end surface 3e is, for example, 250000 to Ser. No. 12/500,000 $\mu m^2$. For example, when the chip size is "5750," the end surface 3e has an area of about 12500000 $\mu m^2$, and when the chip size is "1005," the end surface 3e has an area of about 250000 $\mu m^2$.

The exposed area of the surface of the resin lump 21 is, for example, 1 $\mu m^2$ or more and 250000 $\mu m^2$ or less. For example, the surface of the resin lump 21 has an exposed area of about 150 $\mu m^2$. The exposed area of the surface of the resin lump 21 is an area of the resin lump 21 exposed from the opening PLa when viewed from the direction orthogonal to the end surface 3e (third direction D3). In this case, the exposed area of the surface of the resin lump 21 is defined by, for example, an area of the opening PLa. The exposed area of the surface of the resin lump 21 can be obtained, for example, in the following manner.

A photograph of the surface of the external electrode 5 (electrode portion 5e) that includes the surface of the resin lump 21 is acquired. The acquired photograph is subjected to image processing with software to discern a boundary of the opening PLa, and then, the area of the opening PLa on the acquired photograph is determined.

The resin lump 21 has a thickness of 1 $\mu m$ or more and 100 $\mu m$ or less. In the present embodiment, the resin lump 21 has a thickness of about 5 $\mu m$. The thickness of the resin lump 21 is defined by, for example, the maximum thickness of the resin lump 21. The thickness of the resin lump 21 can be obtained, for example, in the following manner.

A cross-sectional photograph of the external electrode 5 (electrode portion 5e) at a position where the resin lump 21 exists is acquired. The cross-sectional photograph is a photograph of a cross section captured when the electrode portion 5e is cut in a plane orthogonal to the end surface 3e. The cross-sectional photograph is, for example, a photograph of a cross section of the electrode portion 5e captured when the electrode portion 5e is cut in a plane parallel to a pair of surfaces opposing each other (for example, the pair of side surfaces 3c) and equidistant from the pair of surfaces. The acquired cross-sectional photograph is subjected to image processing with software to discern a boundary of the resin lump 21, and then, the maximum thickness of the resin lump 21 in the direction orthogonal to the end surface 3e is determined.

Figure 7:
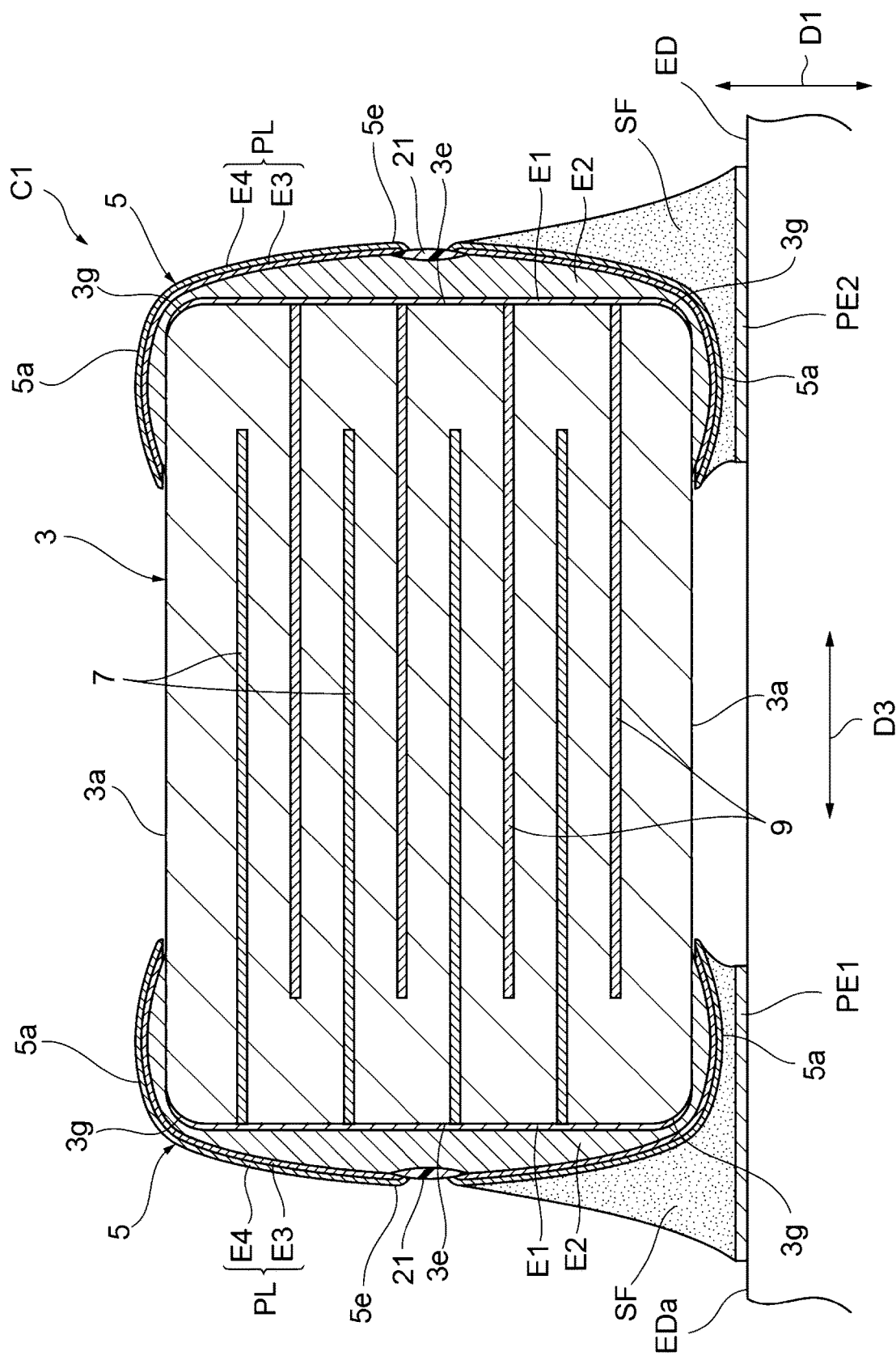
FIG. 7 is a view illustrating a mounting structure of the multilayer capacitor according to the embodiment.

Next, a mounted structure of the multilayer capacitor C1 will be described with reference to FIG. 7. FIG. 7 is a view illustrating a mounting structure of the multilayer capacitor according to the embodiment.

As illustrated in FIG. 7, an electronic component device includes the multilayer capacitor C1 and an electronic device ED. The electronic device ED includes, for example, a circuit board or an electronic component. The multilayer capacitor C1 is solder-mounted on the electronic device ED. The electronic device ED includes a principal surface EDa and a plurality of pad electrodes PE1 and PE2. In the present embodiment, the electronic device ED includes two pad electrodes PE1 and PE2. Each of the pad electrodes PE1 and PE2 is disposed on the principal surface EDa. The two pad electrodes PE1 and PE2 are separated from each other. The multilayer capacitor C1 is disposed on the electronic device ED in such a manner that the principal surface 3a and the principal surface EDa oppose each other. As described above, the principal surface 3a is arranged to constitute the mounting surface.

In solder-mounting the multilayer capacitor C1, the molten solder wets the external electrodes 5 (fourth electrode layers E4). When the wet solder solidifies, a solder fillet SF is formed on each external electrode 5. The external electrodes 5 are connected to the corresponding pad electrodes PE1 and PE2 with the solder fillet SF involved. The resin lumps 21 have low solder wettability. Therefore, the solder fillet SF is not formed on the resin lumps 21. The surface of each resin lump 21 is not covered with the solder fillet SF and is also exposed from the solder fillet SF.

Next, a producing process of the multilayer capacitor C1 according to the present embodiment will be described with reference to FIGS. 8, 9, 10A, 10B, 11A, and 11B. FIGS. 8, 9, 10A, 10B, 11A, and 11B are schematic views illustrating the producing process of the multilayer capacitor according to the embodiment. The producing process of the present embodiment includes a forming process of the resin lumps 21.

First, prepared are a ceramic paste for forming the dielectric layers and an internal electrode paste (electrically conductive paste) for forming the internal electrodes 7 and 9.

The ceramic paste contains, for example, a raw powder of the dielectric material and an organic vehicle. The organic vehicle contains a binder and a solvent. The solvent is, for example, an organic solvent. The ceramic paste may contain a dispersant, a plasticizer, a dielectric, a glass frit, or an insulator. The ceramic paste is known in the art and will not be described in more detail.

The internal electrode paste contains, for example, a powder of the electrically conductive material and an organic vehicle. The powder of the electrically conductive material contained in the internal electrode paste is, for example, a metal powder. The powder is, for example, spherical or scaly. The organic vehicle contains a binder and a solvent. The solvent is, for example, an organic solvent. The internal electrode paste may contain an inorganic compound. The internal electrode paste may contain a plasticizer. The internal electrode paste is known in the art and will not be described in more detail.

Next, ceramic green sheets are formed using the ceramic paste. In this process, for example, the ceramic paste is applied to a carrier sheet in the form of a sheet, and then, the sheet ceramic paste is dried. Thus, the ceramic green sheets are obtained. The carrier sheet includes, for example, polyethylene terephthalate (PET). The ceramic paste is applied, for example, through a doctor-blade method.

Next, using the internal electrode paste, a plurality of internal electrode patterns is formed on each ceramic green sheet. In this process, for example, the internal electrode paste is applied in a patterned manner onto each ceramic green sheet, and then, the internal electrode paste is dried. Thus, the plurality of internal electrode patterns is obtained. The internal electrode paste is applied, for example, through a screen-printing method.

Next, a green laminate is formed from the ceramic green sheets formed with the internal electrode patterns. In this process, for example, the ceramic green sheets are processed to have a predetermined uniform size, and then, predetermined number of ceramic green sheets is laminated. After that, for example, the laminated ceramic green sheets are pressed from the laminating direction. Thus, the green laminate is obtained.

Next, a plurality of green chips is obtained from the green laminate. In this process, for example, the green laminate is cut into chips with a cutting machine. Thus, the plurality of green chips having a predetermined size is obtained.

Next, after removing the binder from the green chips, the green chips are fired. The firing yields the element body 3. After that, the element body 3 is subjected to R chamfering. An example of the R chamfering includes barrel polishing. The binder is removed, for example, through heating the green chips in a reducing atmosphere. The reducing atmosphere includes, for example, air or a mixed gas of $N_2$ and $H_2$. The firing is performed, for example, through heating the green chips from which the binder is removed in a reducing atmosphere. The removal of the binder and firing are known in the art and will not be described in more detail.

Next, the first electrode layer E1 is formed on the element body 3. In this process, as described above, the electrically conductive paste is applied to a predetermined region on the surface of the element body 3, and the applied electrically conductive paste is sintered on the element body 3 through heat treatment. Thus, the first electrode layer E1 is obtained. The electrically conductive paste is applied, for example, through a dipping method, a printing method, or a transferring method. The heat treatment of the electrically conductive pastes is known in the art and will not be described in more detail. In the present embodiment, the electrically conductive paste is applied to the end surface 3e and the ridge portions 3g, 3i, and 3j. The first electrode layer E1 may be formed through, for example, physical vapor deposition (PVD) or chemical vapor deposition (CVD).

Through the above processes, a chip provided with the element body 3 and the first electrode layer E1 is prepared.

Next, the second electrode layer E2 is formed on the chip provided with the element body 3 and the first electrode layer E1. This process includes the following multiple processes. In this process, the electrically conductive resin paste is applied to the chip, and the applied electrically conductive resin paste is treated. As described above, the electrically conductive resin paste contains, for example, an electrically insulating resin, an electrically conductive filler, and an organic solvent.

Figure 8:
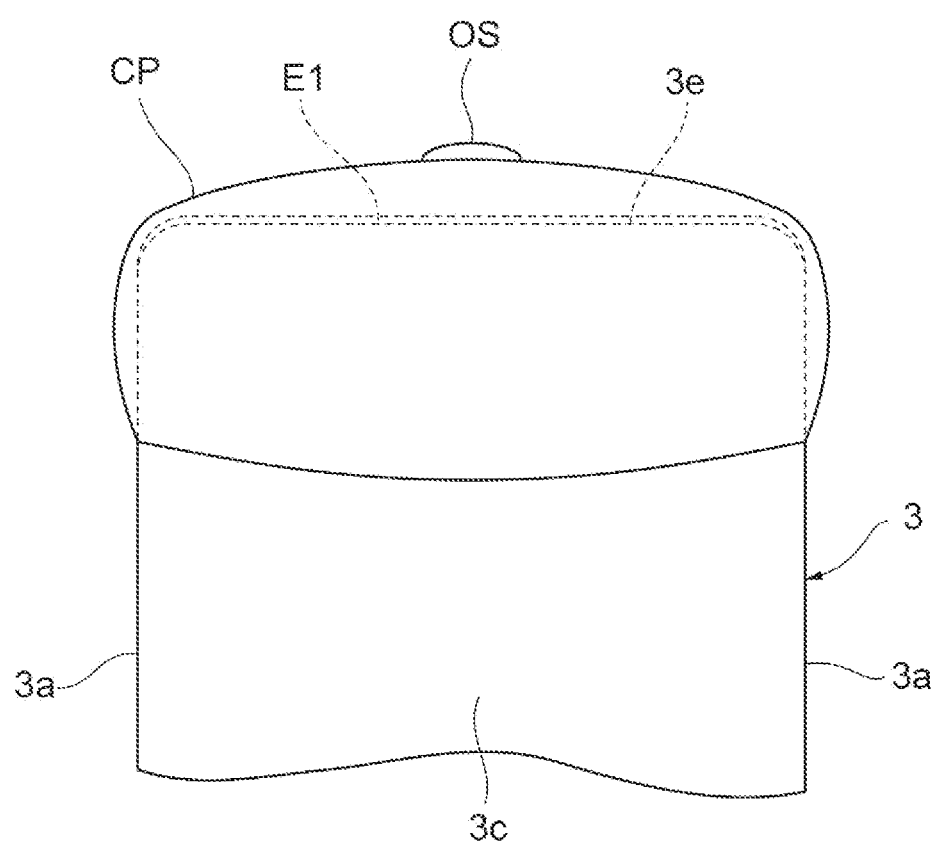
FIG. 8 is a schematic view illustrating a producing process of the multilayer capacitor according to the embodiment.

First, as illustrated in FIG. 8, a paste film CP is formed on the chip provided with the element body 3 and the first electrode layer E1. In this process, the electrically conductive resin paste is applied to a predetermined region on the surface of the chip, and the applied electrically conductive resin paste is dried. Thus, the paste film CP including the electrically conductive resin paste is obtained. The electrically conductive resin paste is applied to the chip in such a manner that the electrically conductive resin paste covers the entire first electrode layer E1 and also partially covers the pair of principal surfaces 3a and the pair of side surfaces 3c. The electrically conductive resin paste is dried so as to remove the organic solvent from the electrically conductive resin paste. In the drying, for example, the electrically conductive resin paste is heated at a temperature of 100 to 200° C. for 3 to 60 minutes. The electrically conductive resin paste may be dried naturally.

Next, as illustrated in FIG. 8, an organic solvent OS is applied to a predetermined region on the surface of the paste film CP. In the present embodiment, the organic solvent OS is applied to the paste film CP in such a manner that the organic solvent OS is placed on a central part of the end surface 3e.

Next, the applied organic solvent OS is dried. The organic solvent OS may be, for example, dried naturally. While the organic solvent OS is dried, a resin contained in the paste film CP (electrically conductive resin paste) dissolves in the organic solvent OS. Therefore, after the organic solvent OS is dried, a resin pool that is to be the resin lump 21 is formed at a position where the organic solvent OS is applied. That is, the resin pool is formed on the surface of the paste film CP. The resin pool is formed with the resin contained in the paste film CP (electrically conductive resin paste). The resin pool is formed before the paste film CP (electrically conductive resin paste) is cured.

Next, the paste film CP formed with the resin pool is treated to cure the electrically conductive resin paste contained in the paste film CP. That is, the electrically conductive resin paste contained in the paste film CP is cured. When the electrically conductive resin paste contains, for example, a thermosetting resin, the paste film CP is heated. In the heat treatment of the paste film CP, for example, the paste film CP is heated at a temperature of 100 to 250° C. for 30 to 120 minutes. When the electrically conductive resin paste contains, for example, a photocurable resin, the paste film CP is irradiated with light having a predetermined wavelength. Depending on the type of electrically conductive resin paste, the paste film CP may be solidified.

Through the above processes, the second electrode layer E2 is formed on the chip provided with the element body 3 and the first electrode layer E1. When the paste film CP is cured, the resin pool is also cured. Thus, the resin lump 21 is formed on a part of the surface of the second electrode layer E2.

Next, the plating layer PL (third electrode layer E3 and fourth electrode layer E4) is formed on the chip formed with the first electrode layer E1 and the second electrode layer E2. In this process, the third electrode layer E3 and the fourth electrode layer E4 are formed through the plating method as described above. The third electrode layer E3 is formed on the second electrode layer E2. The fourth electrode layer E4 is formed on the third electrode layer E3. Since the resin lump 21 includes an electrically insulating resin, the plating layer PL is not formed on the resin lump 21. That is, the resin lump 21 is exposed from the plating layer PL. An example of the plating method for forming the third electrode layer E3 and the fourth electrode layer E4 includes an electroplating method. The plating method for forming the third electrode layer E3 and the fourth electrode layer E4 is known in the art and will not be described in more detail.

Through the above processes, the multilayer capacitor C1 is obtained.

The resin pool may be formed on the paste film CP as illustrated in FIGS. 9, 10A, 10B, 11A and 11B. The resin contained in the paste film CP (electrically conductive resin paste) illustrated in FIGS. 9, 10A, 10B, 11A and 11B is a thermosetting resin.

Figure 9:
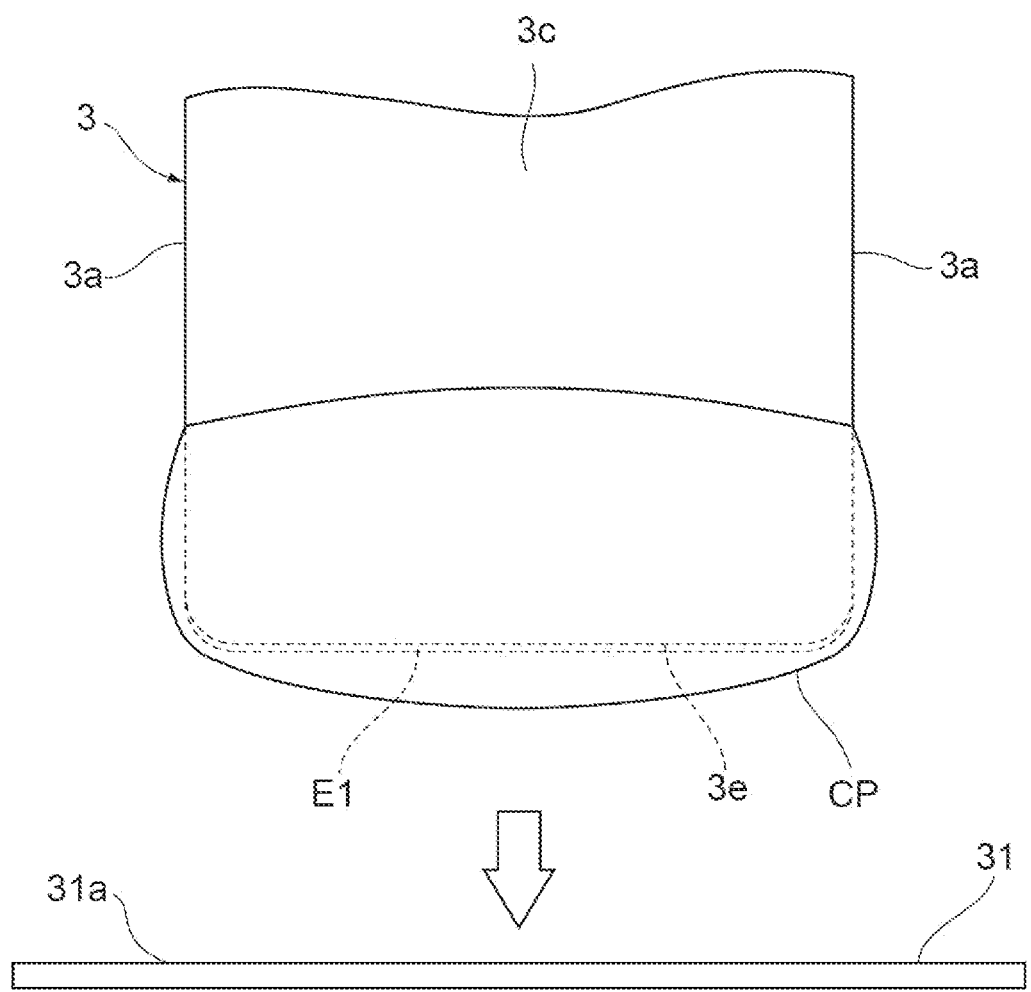
FIG. 9 is a schematic view illustrating a producing process of the multilayer capacitor according to the embodiment.

First, a base 31 is prepared as illustrated in FIG. 9. The base 31 is, for example, a tabular member including a flat surface 31a. The base 31 includes, for example, a fluororesin. The base 31 may include, for example, a metal. In this case, a coating film including a fluororesin may be formed on the flat surface 31a. The fluororesin contains, for example, polytetrafluoroethylene (PTEF).

Figure 10A:
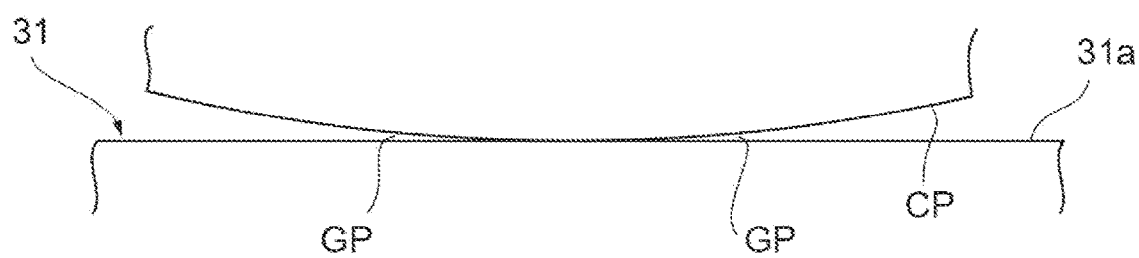
FIGS. 10A and 10B are schematic views illustrating a producing process of the multilayer capacitor according to the embodiment.

Next, the chip formed with the paste film CP is mounted on the base 31. The chip is mounted on the base 31 in such a manner that the paste film CP is in contact with the flat surface 31a as illustrated in FIG. 10A. The surface of the paste film CP includes a region in contact with the flat surface 31a and a region separated from the flat surface 31a. Hereinafter, the region in contact with the flat surface 31a is referred to as "contact region," and the region separated from the flat surface 31a is referred to as "separated region."

The separated region surrounds the contact region. A gap GP is formed between the separated region and the flat surface 31a. That is, the chip formed with the paste film CP is placed on the base 31 in such a manner that the gap GP is generated between a part of the surface of the paste film CP and the base 31 (flat surface 31a). The gap GP is, for example, larger than 0 μm and equal to 100 μm or less.

Figure 10B:
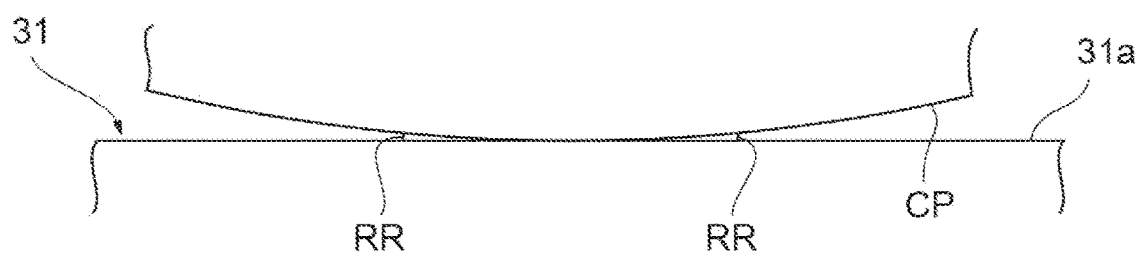

Next, the paste film CP is heat-treated in the presence of the gap GP to cure the electrically conductive resin paste contained in the paste film CP. When the heat treatment is started, the resin contained in the electrically conductive resin paste softens as the temperature rises. The softened resin exudes to the surface of the paste film CP and forms a resin pool RR as illustrated in FIG. 10B. In the present embodiment, the resin pool RR is formed through spreading the softened resin on the gap GP due to capillarity.

When the heat treatment is further advanced, the resin contained in the paste film CP (electrically conductive resin paste) is cured. When the paste film CP is cured, the resin pool RR is also cured. Thus, the resin lump 21 is formed on a part of the surface of the second electrode layer E2.

Figure 11A:
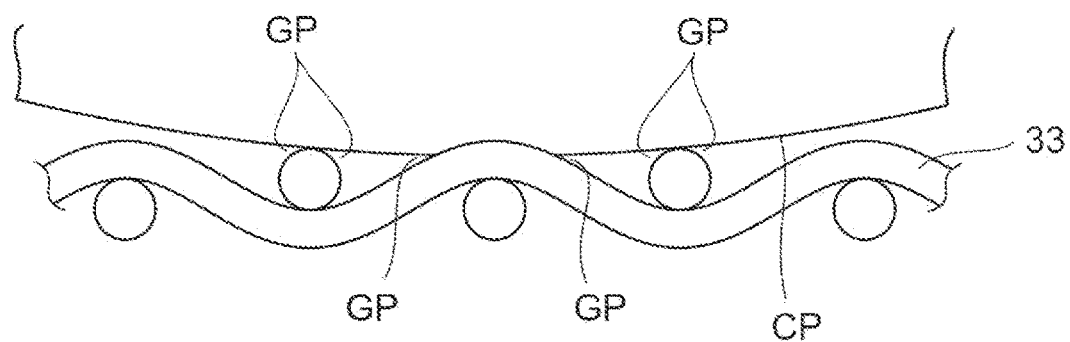
FIGS. 11A and 11B are schematic views illustrating a producing process of the multilayer capacitor according to the embodiment.
Figure 11B:
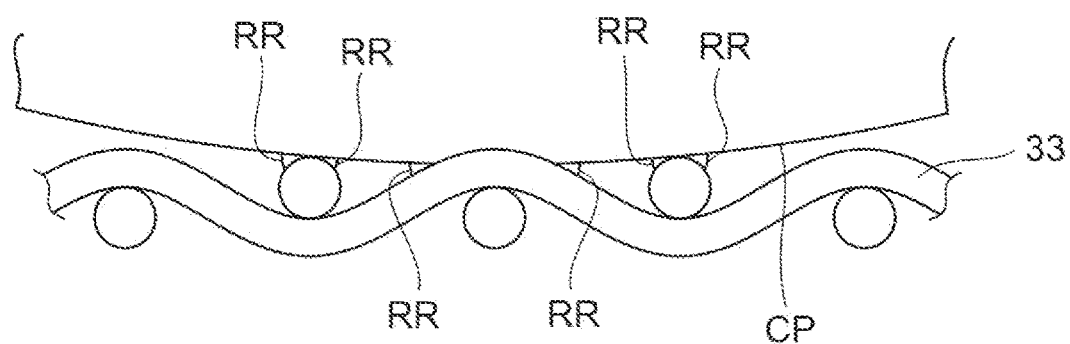

As illustrated in FIGS. 11A and 11B, instead of the base 31, a mesh base 33 may be prepared. In this case, the paste film CP comes into contact with the base 33 at a plurality of positions of the base 33. The base 33 may include, for example, a metal. In this case, the metal includes a stainless steel. The aforementioned coating film including a fluororesin may be formed on the surface of the base 33. The surface of the paste film CP includes a region in contact with the base 33 and a region separated from the base 33. Hereinafter, the region in contact with the base 33 is referred to as "contact region," and the region separated from the base 33 is referred to as "separated region."

Even in the example illustrated in FIG. 11A, the separated region surrounds the contact region. A gap GP is formed between the separated region and the surface of the base 33. That is, the chip formed with the paste film CP is placed on the base 31 in such a manner that the gap GP is generated between a part of the surface of the paste film CP and the base 33 (the surface of the base 33).

When the heat treatment of the paste film CP is started, as described above, the resin contained in the electrically conductive resin paste is softened, and the softened resin exudes to the surface of the paste film CP and forms resin pools RR as illustrated in FIG. 11B. When the heat treatment is further advanced, the paste film CP is cured and the resin pools RR are also cured. Thus, the resin lump 21 is formed on a part of the surface of the second electrode layer E2. In the example illustrated in FIGS. 11A and 11B, a plurality of resin lumps 21 is disposed on each external electrode 5.

As described above, the resin lump 21 in the multilayer capacitor C1 is exposed from the plating layer PL. Therefore, in solder-mounting the multilayer capacitor C1 on an electronic device, even in a case where moisture absorbed by the resin contained in the second electrode layer E2 is gasified, the gas generated from the moisture moves out of the external electrode 5 through the resin lump 21 from the second electrode layer E2. That is, the gas generated from the moisture is discharged from the resin lump 21 (the surface of the resin lump 21). Therefore, stress tends not to apply to the second electrode layer E2. Consequently, the multilayer capacitor C1 controls the peel-off of the second electrode layer E2.

The element body 3 includes the principal surface 3a arranged to constitute the mounting surface and the end surface 3e adjacent to the principal surface 3a. The resin lumps 21 are positioned on the end surfaces 3e.

When the multilayer capacitor C1 is solder-mounted on an electronic device, the principal surface 3a opposes the electronic device, but the end surface 3e does not oppose the electronic device. Therefore, the configuration in which the resin lump 21 is positioned on the end surface 3e tends not to prevent the gas generated from moisture from being discharged from the resin lump 21 (the surface of the resin lump 21). Consequently, in the multilayer capacitor C1, the gas generated from the moisture is reliably discharged from the second electrode layer E2.

The ratio Ra is 0.000001 to 0.1.

The configuration in which the ratio Ra is 0.000001 or more reliably discharges the gas generated from the moisture from the second electrode layer E2. The configuration in which the ratio Ra is 0.1 or less reduces an increase in amount of the moisture that penetrates into the second electrode layer E2 from the surface of the resin lump 21.

The resin lump 21 has a thickness of 1 μm or more and 100 μm or less.

The configuration in which the thickness of the resin lump 21 is 1 μm or more reliably discharges the gas generated from the moisture from the second electrode layer E2. In the configuration in which the thickness of the resin lump 21 is 100 μm or less, the resin lump 21 tends not to interfere with the solder-mounting, and the second electrode layer E2 reliably exerts the stress relaxation effects.

The surface of the resin lump 21 includes an exposed area of 1 μm$^2$ or more and 250000 μm$^2$ or less.

The configuration in which the exposed area of the surface of the resin lump 21 is 1 μm$^2$ or more reliably discharges the gas generated from the moisture from the second electrode layer E2. The configuration in which the exposed area of the surface of the resin lump 21 is 250000 μm$^2$ or less reduces an increase in amount of the moisture that penetrates into the second electrode layer E2 from the surface of the resin lump 21.

In the configuration in which the exposed area of the surface of the resin lump 21 is 250000 μm$^2$ or less, the solder fillet SF is reliably formed when the multilayer capacitor C1 is solder-mounted on an electronic device. Consequently, the mounting strength of the multilayer capacitor C1 is ensured.

The resin contained in the resin lump 21 is the same as the resin R contained in the second electrode layer E2. Therefore, the multilayer capacitor C1 that prevents the peel-off of the second electrode layer E2 can be obtained easily and at low cost.

In the production method illustrated in the present embodiment, the resin pool RR is formed on the surface of the paste film CP with the resin contained in the electrically conductive resin paste, before curing the paste film CP (electrically conductive resin paste). The resin lump 21 is obtained from the resin pool RR formed on the surface of the paste film CP. When the plating layer PL is formed on the second electrode layer E2, the plating layer PL tends not to be formed on the surface of the resin lump 21. Therefore, the surface of the resin lump 21 is exposed from the plating layer PL. Consequently, the multilayer capacitor C1 obtained through the production method illustrated in the present embodiment controls the peel-off of the second electrode layer E2 as described above.

Since the resin pool RR is formed with the resin contained in the paste film CP (electrically conductive resin paste), it is not necessary to newly prepare a resin for forming the resin pool RR. Therefore, the multilayer capacitor C1 that controls the peel-off of the second electrode layer E2 is obtained easily and at low cost.

In the production method illustrated in the present embodiment, the resin pool RR is formed through applying an organic solvent to the surface of the paste film CP before curing the paste film CP (electrically conductive resin paste).

In this case, the resin RR pool is formed reliably and easily.

In the production method illustrated in the present embodiment, the resin contained in the paste film CP (electrically conductive resin paste) is a thermosetting resin. When the paste film CP (electrically conductive resin paste) is thermally cured, the resin contained in the electrically conductive resin paste is exuded to the surface of the paste film CP to form the resin pool RR.

In this case, the resin pool RR is formed reliably and easily.

In the production method illustrated in the present embodiment, the element body 3 formed with the paste film CP is placed on the base 31 or 33 in such a manner that the gap GP is generated between a part of the paste film CP and the base 31 or 33. The resin pool RR is formed through spreading the softened resin on the gap GP due to capillarity.

In this case, the resin pool RR is formed more reliably and easily.

The gap GP has a size of 100 μm or less.

In this case, the softened resin reliably spreads on the gap GP due to capillarity.

Figure 12:
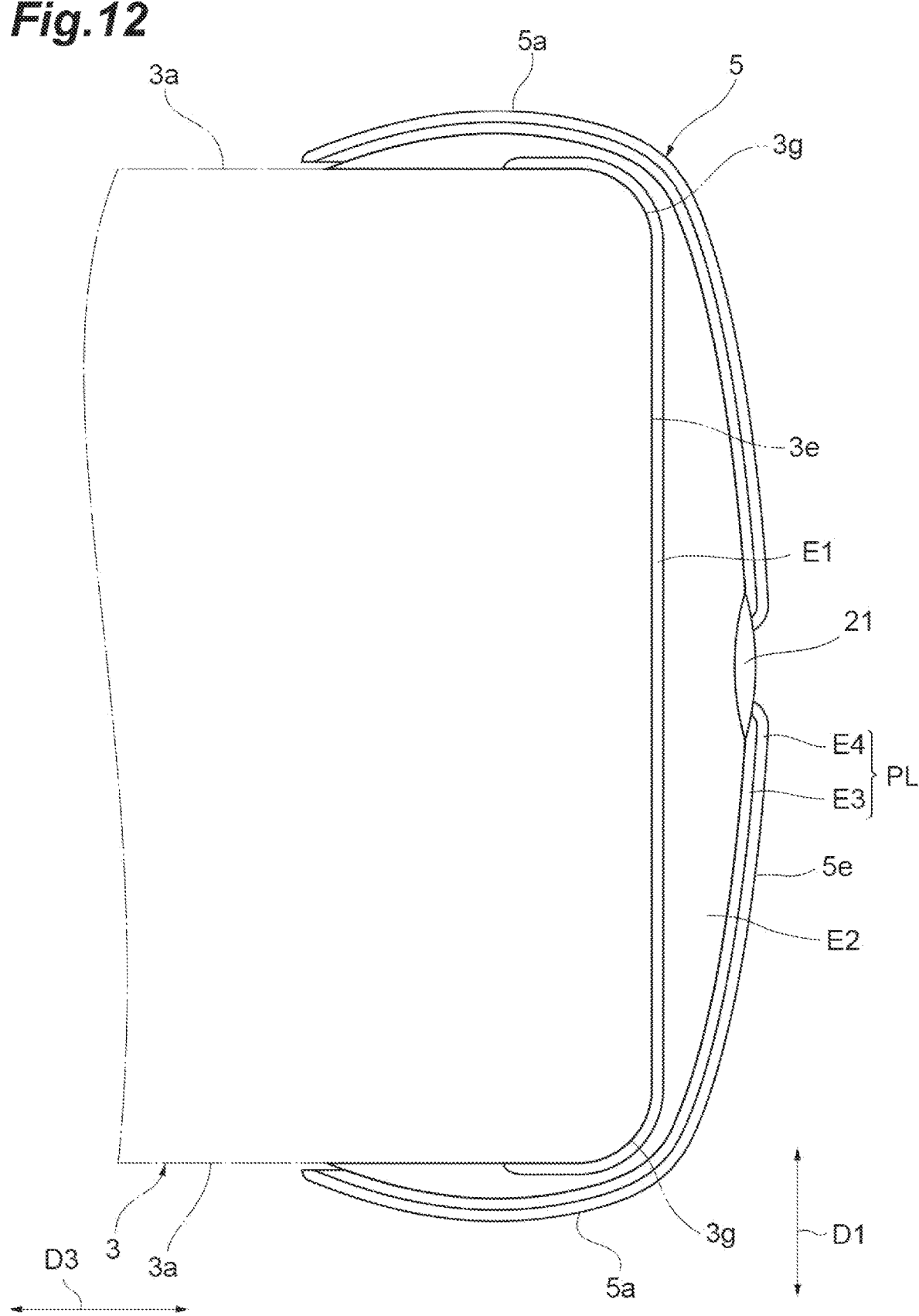
FIG. 12 is a view illustrating a cross-sectional configuration of an external electrode.

A configuration of a multilayer capacitor according to a modification of the present embodiment will be described with reference to FIG. 12. FIG. 12 is a view illustrating a cross-sectional configuration of an external electrode. The multilayer capacitor according to the modification is generally similar to or the same as the multilayer capacitor C1 described above. However, the configuration of the first electrode layer E1 of the modification is different from that in the embodiment described above. Hereinafter, a difference between the embodiment and the modification will be mainly described. In FIG. 12, hatching representing a cross section is omitted.

The multilayer capacitor according to the modification includes the element body 3 and the plurality of external electrodes 5, as with the multilayer capacitor C1. Each of the external electrodes 5 includes the plurality of electrode portions 5a, 5c, and 5e. Each of the external electrodes 5 includes the first electrode layer E1, the second electrode layer E2, the third electrode layer E3, and the fourth electrode layer E4. The multilayer capacitor according to the modification also includes the plurality of internal electrodes 7 and the plurality of internal electrodes 9, although not illustrated in the drawing.

As illustrated in FIG. 12, the first electrode layer E1 included in the electrode portion 5a is disposed on the principal surface 3a. The first electrode layer E1 included in the electrode portion 5a is formed to cover one part of the principal surface 3a and the entirety of the ridge portion 3g. The first electrode layer E1 is disposed on the principal surface 3a and the end surface 3e. The first electrode layer E1 is continuously disposed on the principal surface 3a and the end surface 3e. The first electrode layer E1 included in the electrode portion 5a is in contact with the one part of the principal surface 3a. The one part of the principal surface 3a is, for example, a partial region close to the end surface 3e, in the principal surface 3a.

The first electrode layer E1 included in the electrode portion 5c is disposed on the side surface 3c, although not illustrated in the drawing. The first electrode layer E1 included in the electrode portion 5c is formed to cover one part of the side surface 3c and the entirety of the ridge portion 3i. The first electrode layer E1 is disposed on the side surface 3c and the end surface 3e. The first electrode layer E1 is continuously disposed on the side surface 3c and the end surface 3e. The first electrode layer E1 included in the electrode portion 5c is in contact with the one part of the side surface 3c. The one part of the side surface 3c is, for example, a partial region close to the end surface 3e, in the side surface 3c.

In the present specification, in a case where an element is described as being disposed on another element, the element may be directly disposed on the other element or be indirectly disposed on the other element. In a case where an element is indirectly disposed on another element, an intervening element is present between the element and the other element. In a case where an element is directly disposed on another element, no intervening element is present between the element and the other element.

In the present specification, in a case where an element is described as being positioned on another element, the element may be directly positioned on the other element or be indirectly positioned on the other element. In a case where an element is indirectly positioned on another element, an intervening element is present between the element and the other element. In a case where an element is directly positioned on another element, no intervening element is present between the element and the other element.

In the present specification, in a case where an element is described as covering another element, the element may directly cover the other element or indirectly cover the other element. In a case where an element indirectly covers another element, an intervening element is present between the element and the other element. In a case where an element directly covers another element, no intervening element is present between the element and the other element.

Although the embodiment and modifications of the present invention have been described above, the present invention is not necessarily limited to the embodiment and modifications, and the embodiment can be variously changed without departing from the scope of the invention.

The resin lump 21 may be positioned on the principal surface 3a. The resin lump 21 may be positioned on the side surface 3c.

In the configuration in which the resin lump 21 is positioned on the end surface 3e, as described above, the gas generated from the moisture is reliably discharged from the second electrode layer E2.

The ratio Ra may be smaller than 0.000001. The ratio Ra may be larger than 0.1.

In the configuration in which the ratio Ra is 0.000001 or more, as described above, the gas generated from the moisture is reliably discharged from the second electrode layer E2. The configuration in which the ratio Ra is 0.1 or less reduces an increase in amount of the moisture that penetrates into the second electrode layer E2 from the surface of the resin lump 21, as described above.

The resin lump 21 may have a thickness smaller than 1 μm. The resin lump 21 may have a thickness larger than 100 pin.

The configuration in which the thickness of the resin lump 21 is 1 μm or more reliably discharges the gas generated from the moisture from the second electrode layer E2, as described above. In the configuration in which the thickness of the resin lump 21 is 100 μm or less tends not to interfere with the solder-mounting, and the second electrode layer E2 reliably exerts the stress relaxation effects, as described above.

The gap GP may be larger than 100 μm.

When the gap GP has a size of 100 μm or less, as described above, the softened resin reliably spreads on the gap GP due to capillarity.

The electronic components of the present embodiment and modification are the multilayer capacitors. Applicable electronic component is not limited to the multilayer capacitor. Examples of the applicable electronic components include, but not limited to, multilayer electronic components such as a multilayer inductor, a multilayer varistor, a multilayer piezoelectric actuator, a multilayer thermistor, or a multilayer composite component, and electronic components other than the multilayer electronic components.

What is claimed is:

1. An electronic component comprising:
an element body;
an internal conductor disposed in the element body; and
an external electrode disposed on the element body,
wherein the external electrode includes a conductive resin layer and a plating layer disposed on the conductive resin layer,
the conductive resin layer includes a surface partially provided with a resin lump including an electrically insulating resin,
the element body includes a principal surface arranged to constitute a mounting surface and an end surface that is adjacent to the principal surface and where the internal conductor is exposed, and
the resin lump is positioned on the end surface and includes a surface exposed from the plating layer.

2. The electronic component according to claim 1, wherein the surface of the resin lump has an exposed area ratio of 0.000001 to 0.1 to an area of the end surface.

3. The electronic component according to claim 1, wherein the resin lump has a thickness of 1 μm or more and 100 μm or less.

4. The electronic component according to claim 1, wherein the resin lump contains a resin being the same as a resin contained in the conductive resin layer.

5. A method for producing an electronic component, wherein the electronic component is the electronic component according to claim 1, and
the method comprises:
forming a paste film including an electrically conductive resin paste on the element body and curing the electrically conductive resin paste of the paste film to form the conductive resin layer; and
forming the plating layer on the conductive resin layer,
wherein a resin pool which is to be the resin lump on a surface of the paste film is formed with a resin contained in the electrically conductive resin paste, before curing the electrically conductive resin paste.

6. The method for producing an electronic component according to claim 5,
wherein the resin pool is formed through applying an organic solvent to the surface of the paste film, before curing the electrically conductive resin paste.

7. The method for producing an electronic component according to claim 5,
wherein the resin contained in the electrically conductive resin paste is a thermosetting resin, and
when the electrically conductive resin paste is thermally cured, the resin contained in the electrically conductive resin paste is exuded to the surface of the paste film to form the resin pool.

8. The method for producing an electronic component according to claim 7, the method comprising:
preparing a base on which the element body formed with the paste film is placed;
placing the element body formed with the paste film on the base in such a manner that a gap is formed between a part of the paste film and the base; and
softening the resin and spreading the resin on the gap due to capillarity to form the resin pool.

9. The method for producing an electronic component according to claim 8,
wherein the gap has a size of 100 μm or less.

* * * * *